US011436482B2

(12) United States Patent
Qin

(10) Patent No.: US 11,436,482 B2
(45) Date of Patent: Sep. 6, 2022

(54) STORING NEURAL NET WORKS AND WEIGHTS FOR NEURAL NETWORKS

(71) Applicant: Western Digital Technologies, Inc., San Jose, CA (US)

(72) Inventor: Minghai Qin, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 937 days.

(21) Appl. No.: 16/174,014

(22) Filed: Oct. 29, 2018

(65) Prior Publication Data

US 2020/0134443 A1 Apr. 30, 2020

(51) Int. Cl.
G06N 3/08 (2006.01)
G06N 3/10 (2006.01)

(52) U.S. Cl.
CPC .............. G06N 3/08 (2013.01); G06N 3/10 (2013.01)

(58) Field of Classification Search
CPC .................................. G06N 3/08; G06N 3/10
See application file for complete search history.

(56) References Cited

U.S. PATENT DOCUMENTS

| 9,208,431 | B2 | 12/2015 | Hunzinger et al. |
| 2016/0358069 | A1 | 12/2016 | Brothers et al. |
| 2017/0206405 | A1 | 7/2017 | Molchanov et al. |

FOREIGN PATENT DOCUMENTS

| CN | 107895170 A | 4/2018 |
| CN | 107977704 A | 5/2018 |

OTHER PUBLICATIONS

Qin, Minghai, Chao Sun, and Dejan Vucinic. "Robustness of neural networks against storage media errors." arXiv preprint arXiv: 1709.06173 (2017). (Year: 2017).*
Courbariaux, Matthieu, et al. "Binarized neural networks: Training deep neural networks with weights and activations constrained to + 1 or-1." arXiv preprint arXiv: 1602.02830 (2016). (Year: 2016).*
Chi, Ping, et al. "Prime: A novel processing-in-memory architecture for neural network computation in reram-based main memory." ACM SIGARCH Computer Architecture News 44.3 (2016): 27-39. (Year: 2016).*
Qin, M., et al., "Robustness of Neural Networks against Storage Media Errors," Sep. 18, 2017, arXiv:1709.06173v1, 9 pages.

* cited by examiner

*Primary Examiner* — Benjamin P Geib
(74) *Attorney, Agent, or Firm* — Ravi Mohan; Rutan & Tucker, LLP

(57) ABSTRACT

Systems and methods are disclosed for storing neural networks and weights for neural networks. In some implementations, a method is provided. The method includes storing a plurality of weights of a neural network comprising a plurality of nodes and a plurality of connections between the plurality of nodes. Each weight of the plurality of weights is associated with a connection of the plurality of connections. The neural network comprises a binarized neural network. The method also includes receiving input data to be processed by the neural network. The method further includes determining whether a set of weights of the plurality of weights comprises one or more errors. The method further includes refraining from using the set of weights to process the input data using the neural network in response to determining that the set of weights comprises the one or more errors.

20 Claims, 6 Drawing Sheets

STORING NEURAL NETWORKS AND WEIGHTS FOR NEURAL NETWORKS

BACKGROUND

Field of the Disclosure

This disclosure relates to data storage devices. More particularly, the disclosure relates to storing neural networks and weights for neural networks.

Description of the Related Art

Data storage devices may be used to store data used by computing devices. In addition, computing devices may communicate data with each other (e.g., transmit and/or receive data). Neural networks and/or the weights used by the neural networks may be stored on the data storage devices. In addition, neural networks and/or the weights used by neural networks may be transmitted from one computing device to another computing device.

SUMMARY

In some implementations, the present disclosure relates to a method. The method includes storing a plurality of weights of a neural network comprising a plurality of nodes and a plurality of connections between the plurality of nodes. Each weight of at least some of the plurality of weights is associated with a connection of the plurality of connections. The neural network comprises a binarized neural network. The method also includes receiving input data to be processed by the neural network. The method further includes determining whether a set of weights of the plurality of weights comprises one or more errors. The method further includes refraining from using the set of weights to process the input data using the neural network in response to determining that the set of weights comprises the one or more errors.

In some implementations, the present disclosure relates to an apparatus. The device includes a network interface and a processing device. The processing device is configured to receive, via the network interface, a plurality of weights of a neural network. The neural network comprises a plurality of nodes and a plurality of connections between the plurality of nodes. Each weight of at least some of the plurality of weights is associated with a connection of the plurality of connections. Each weight of at least some of the plurality of weights comprises one of two values. The processing device is also configured to determine whether a set of weights of the plurality of weights comprises one or more errors. The processing device is further configured to selectively refrain from using the set of weights to process input data using the neural network in response to determining that the set of weights comprises the one or more errors.

In some implementations, the present disclosure relates to an apparatus. The apparatus includes a processing device configured to store a plurality of weights of a neural network comprising a plurality of nodes and a plurality of connections between the plurality of nodes. Each weight of the plurality of weights is associated with a connection of the plurality of connections. The neural network comprises a binarized neural network. The processing device is also configured to determine whether a set of weights of the plurality of weights comprises one or more errors based on a parity check. The set of weights comprises multiple weights. The multiple weights share the parity check. The processing device is further configured to refrain from using the set of weights to process the input data using the neural network in response to determining that the set of weights comprises the one or more errors.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
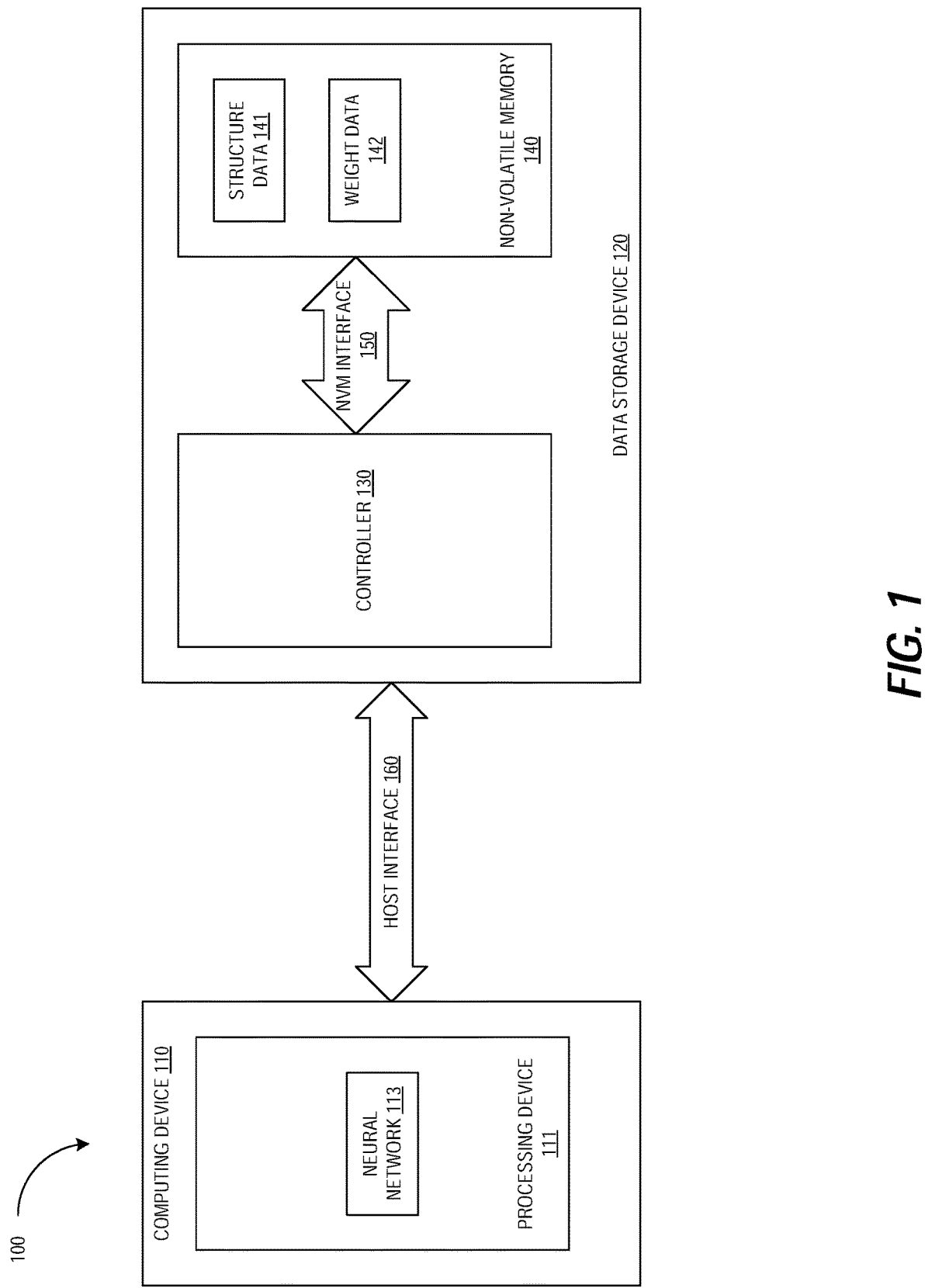
FIG. 1 is a diagram illustrating an example data storage system, in accordance with one or more embodiments of the present disclosure.

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example implementations, configurations, and/or embodiments relating to storing neural networks and weights for neural networks.

Data storage devices, such as solid state drives (SSDs), hard disk drives (HDDs), hybrid drives (e.g., storage drives/devices that include both magnetic media/medium and flash memory), etc., typically include one or more controllers coupled with one or more non-volatile memory (NVM) arrays. Stored data may be subject to loss and/or corruption. For example, data may be lost, damaged, corrupted, etc., due to failure of memory cells, damage (e.g., physical damage), degradation, read/write disturbs, loss of data retention, loss of endurance, etc. Data storage devices may generally utilize one or more error correction codes (ECCs) and/or error coding mechanisms to detect and/or correct errors in the data that is stored within the data storage devices (e.g., stored within the NVM arrays). For example, the data storage devices may generate codewords that encode data using an ECC. The ECC may allow the codeword to be decoded even if there errors in the codeword (e.g., there are errors in one or more bits of the codeword). One type of ECC that may be used by data storage devices to code data is a low-density parity-check (LDPC) code. Another type of ECC that may be used by data storage devices to code data is a polar code.

Although ECCs may be used to correct errors in data, using ECCs may increase the amount of storage space used in a non-volatile memory to store the data (e.g., the protected data). For example, if the data storage device uses an ECC to generate a codeword to encode data, the amount of space used to store the codeword may be twenty percent more than the amount of space used to store the data without encoding the data into a codeword. Thus, using ECCs may reduce the amount of data that may be stored in a data storage device. In addition, the weights of a neural network may use a large amount of space on the data storage device. For example, each weight may use 32-bits of data to represent a 32-bit fixed or floating point number. If ECCs are used to protect the weights of the neural network from errors, this may further increase the amount of space used to store the weights of the neural network.

FIG. 1 is a diagram illustrating an example data storage system 100, in accordance with some embodiments of the present disclosure. The data storage system 100 includes a computing device 110 and a data storage device 120. The computing device 110 may also be referred to as a host system. In one embodiment, the data storage device 120 may be part of the computing device 110 (e.g., may be located inside of a housing, chassis, case, etc., of the computing device 110). In another example, the data storage device 120 may be separate from the computing device 110 (e.g., may be an external device that is coupled to the computing device 110 via a cable, such as a universal serial bus (USB) cable).

The data storage device 120 may incorporate access command scheduling and/or execution in accordance with embodiments, examples, and/or implementations disclosed herein. The data storage device 120 may be any type of data storage device, drive, module, component, system, or the like. Furthermore, the terms "drive" and "data storage drive" may be used herein in certain contexts to refer to any type of data storage device, and may be used substantially interchangeably with the term "data storage device" herein in connection with various embodiments and/or in various contexts. As shown, the data storage device 120 (e.g., hybrid hard drive, solid-state drive, any storage device utilizing solid-state memory, a hard disk drive, any storage device utilizing magnetic media/medium, etc.) includes a controller 130 (e.g., control circuitry, software, firmware, or a combination thereof) and a non-volatile memory 140.

The non-volatile memory (NVM) 140 may be configured for long-term storage of data and may retain data between power on/off cycles of the data storage device 120. The non-volatile memory 140 and/or portions of the non-volatile memory 140 may also be referred to as a storage medium. In some embodiments, the non-volatile memory 140 may include solid-state memory. Solid-state memory may comprise a wide variety of technologies, such as flash integrated circuits, Phase Change Memory (PC-RAM, PCM, or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple level cell (TLC) memory, X4 or quad-level cell (QLC) memory, etc.), NOR memory, EEPROM, Ferroelectric Memory (FeRAM), magnetoresistive RAM (MRAM), or other discrete solid-state memory chips. In other embodiments, the non-volatile memory 140 may include magnetic media (including shingle magnetic recording), optical disks, floppy disks, electrically programmable read only memories (EPROM), electrically erasable programmable read only memories (EEPROM), etc. Non-volatile memory that uses magnetic media/medium may include one or more magnetic platters. Each platter may contain one or more regions of one or more tracks of data. The non-volatile memory 140 may include any combination of the one or more types of memories described here. The non-volatile memory 140 may be divided logically and/or physically into arrays, planes, blocks, pages, tracks, and sectors. While non-volatile memories are used as illustrative and teaching examples in this disclosure, those skilled in the art will recognize that various embodiments are applicable to volatile memories (e.g., Dynamic Random Access Memory (DRAM)) as well, as error correction codes are also used in those memories to protect data.

The controller 130 may include one or more processors, memory devices, data and/or power transmission channels/paths, boards, or the like. In some embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the controller 130 may be mounted on a printed circuit board (PCB). The controller 130 may be configured to receive data commands from a storage interface (e.g., a device driver) residing on the computing device 110.

The controller 130 may communicate with the computing device 110 over a host interface 160, and may receive commands via the host interface 160. These commands may be referred to as data commands, data access commands, data storage access commands, etc. Data commands may specify a block address in the data storage device 120. Data may be accessed/transferred based on such data commands. For example, the controller 130 may receive data commands (from the computing device 110) and may execute such commands on/in the non-volatile memory 140 (e.g., in one or more arrays, pages, blocks, sectors, etc.). The data commands received from computing device 110 may include read data commands, write data commands, and erase data commands. The controller 130 may be coupled to the non-volatile memory (NVM) 140 via a NVM interface 150. In one embodiment, the NVM interface 150 may include a plurality of channels (e.g., one or more lines, pines, wires, traces, etc.) and each channel may be coupled to different portions of the non-volatile memory 140 (e.g., different NVM arrays, different flash arrays, etc.).

The controller 130 may execute the received data commands to read, write, and erase data from non-volatile memory 140, via the NVM interface 150. For example, the commands may include a read command (e.g. a data read command) to read a block of data from the non-volatile memory 140. The controller 130 may read the data from the page and may transmit the data to the computing device 110 via the host interface 160. In another example, the commands may include a write command (e.g., a data write command) to write data to a page in a non-volatile memory 140. In one embodiment, write commands may include program commands (e.g., a command to write the value "1" to a location the non-volatile memory 140) and erase commands (e.g., a command to write the value "0" to a location, a page, a block, etc., in the non-volatile memory array). The controller 130 may receive the data from the computing device 110 via the host interface 160 and may write the data to the page. The host interface 160 may include hardware (e.g., wires, pins, traces, connectors, etc.), software (e.g., drivers), firmware, or a combination thereof, that allows the processing device 111 and/or the computing device 110 to communicate data with the data storage device 120. Examples of a host interface may include a peripheral component interconnect express (PCIe) bus, a serial AT attachment (SATA) bus, a non-volatile memory express (NVMe) bus, etc.

The data storage device 120 may store data received from the computing device 110 such that the data storage device 120 acts as data storage for the computing device 110. To facilitate this function, the controller 130 may implement a logical interface. The logical interface may present to the computing device memory a set of logical addresses (e.g., sequential/contiguous addresses) where data may be stored. Internally, the controller 130 may map logical addresses to various physical memory addresses in the non-volatile memory arrays and/or other memory module(s). Mapping data indicating the mapping of logical addresses to physical memory addresses may be maintained in the data storage device. For example, mapping table data may be stored in non-volatile memory 140 in order to allow for recreation of mapping tables following a power cycle.

The controller 130 may encode data when storing the data on the non-volatile memory 140. The controller 130 may encode the data to protect the data from errors, loss, corruption, etc. The controller 130 may protect the data from errors, loss, corruption, etc., using various methods, techniques, functions, operations, actions, etc. In one embodiment, the controller 130 may protect the data by generating parity data (e.g., parity bits). The parity data may allow the controller 130 to determine whether there are errors in the data (e.g., errors due to corruption, damaged cells, damaged blocks, error while reading the data, etc.). The parity data (e.g., one or more parity bits) may be generated using various algorithms, techniques, functions, operations, etc. In another embodiment, the controller 130 may use an ECC to generate codewords. The codewords may also allow the controller 130 (e.g., the decoder 132) to correct or recover from errors in the codewords.

The controller 130 may also decode data that stored on the non-volatile memory 140. In one embodiment, the decoder 132 may decode codewords which encode the data that is stored on the non-volatile memory 140. In another embodiment, the decoder 132 may perform error detection to determine the integrity of data retrieved from non-volatile memory 140 (e.g., to determine whether the data has errors). For example, the decoder 132 may use parity data to check the data to determine whether there is an error in the data (e.g., whether one or more bits in the data are incorrect due to corruption, damage cells, damaged blocks, etc.).

As illustrated in FIG. 1, the computing device 110 includes, executes or otherwise implements a neural network 113. In one embodiment, the processing device 111 may execute or run the neural network 113. For example, the processing device 111 may construct the neural network 113 and may provide input data to the neural network 113. The neural network 113 may be used in machine learning tasks. In some embodiments, the neural network 113 may include a collection of connected and/or interconnected nodes. The nodes may also be referred to as neurons. Each node may transmit a signal, messages, data, information, etc., to one or more other nodes. A node may receive a signal, message, data, information, etc., from another node and may generate additional signals, messages, data, information, etc., to transmit to other nodes that are connected to it. The neural network 113 may be a computing model that may be used to determine a feature in input data through various computations. The neural network 113 may determine a feature (e.g., a number, shape, pattern, etc.) in input data (e.g., audio data, image data, video data, etc.) according to a structure that defines a sequence of computations to be performed, and weight values that define coefficients applied to the computations.

The neural network 113 may also include weights or weight values. The weights or weight values may be scaling factors between two or more nodes. The scaling factors may be applied to corresponding inputs or outputs of the nodes. For example, a weight value associated with a connection may represent a coefficient or a scaling factor multiplied to an output of a node in that connection. The structure of the neural network 113 may define connections of different nodes with corresponding inputs and outputs. The weight values may define scaling factors applied to corresponding inputs or outputs of the nodes. A weight value may also be associated with a connection between a first node and a second node. The weight value associated with the connection may represent a coefficient or a scaling factor that is multiplied to an output of the first node and the output of the first node is provided to an input of the second node.

In one embodiment, the neural network 113 may be a convolutional neural network (CNN). A CNN may be a feed forward neural network. A feed forward neural network may be a type of neural network where the connections between the nodes do not form a cycle. For example, the signals, messages, data, information etc., flow forward from the input nodes, through the hidden nodes, to the output nodes of the CNN. CNNs are discussed in more detail below.

In another embodiment, the neural network 113 may be a recurrent neural network (RNN). A RNN may be a neural network where the connections between nodes may form a directed graph. A RNN may be a type of neural network where the connections between the nodes may form a cycle. For example, the node of a RNN may be directed back towards a node in a previous layer or sub-layer. This may allow a RNN to exhibit temporal dynamic behavior.

As illustrated in FIG. 1, the non-volatile memory 140 includes structure data 141 (e.g., the structure data 141 is stored in portions of the non-volatile memory 140). In one embodiment, the processing device 111 may construct the neural network 113 based on structure data 141. The structure data 141 may be data that indicates the structure of the neural network 113. For example, the neural network 113 may include a plurality of nodes and various connections between the plurality of nodes, as discussed below. The structure data 141 may indicate or identify the different nodes of the neural network 113. The structure data 141 may also indicate how the nodes of the plurality of nodes are connected to each other (e.g., may indicate interconnections between the plurality of nodes). For example, the structure data 141 may define connections between different nodes with corresponding inputs and outputs.

Also as illustrated in FIG. 1, the non-volatile memory 140 includes weight data 142 (e.g., the weight data 142 is stored in portions of the non-volatile memory 140). The weight data 142 may indicate the weights or weight values associated with nodes or connections between the nodes. For example, the weight data 142 may indicate a weight (e.g., a scaling factor, a multiplier, etc.), that may be applied to the connections between the nodes. As discussed above, the weight may be applied to the output of a first node that is connected to a second node. The weight data 142 may indicate a set of weights (e.g., one or more weights) for the neural network 113. Each weight in the set of weights may be associated with a connection between nodes in the neural network 113.

In one embodiment, the processing device 111 may obtain the weight data 142 (e.g., the weights associated with the connections and/or nodes of the neural network 113) by training the neural network based on training data. For example, the processing device 111 may construct the neural network 113 with an initial structure (e.g., an initial set of connections between various nodes) and may use a set of initial weights. The initial structure and initial weights may be determined based on user input, default settings/parameters, etc. The processing device 111 may receive training data and may train the neural network 113 by providing the input data to the neural network 113 and applying the neural network 113 on the training data (e.g., by processing the training data using the neural network 113). The training data may be a large data set (e.g., millions of files) that may be applied or provided to the neural network 113 to train the neural network 113 to detect one or more features (e.g., one or more target features). The processing device 111 may update the structure of the neural network 113 (e.g., update how the nodes of the neural network 113 are connected) and/or may update the weights of the neural network 113 (e.g., update the values of the weights that are associated with the nodes and/or connections of the neural network 113). Once the neural network 113 is trained, the processing device 111 may store the updated (e.g., trained) structure of the neural network 113 in the structure data 141 and the updated (e.g., trained) weights in the weight data 142. Generally, the weight data 142 may be larger (e.g., may use more storage space) than the structure data 141.

In one embodiment, a dropout technique may be used when training the neural network 113. The dropout technique may ignore, deactivate, not use, etc., one or more nodes of the neural network 113 during the training of the neural network 113. The connections that originate from and/or lead to nodes (which are dropped out, ignored, deactivated) may also be ignored, deactivated, unused, etc. The dropout technique may help prevent over-fitting. Overfitting may refer to a situation where the neural network may be too closely tied to or fitted to the training data, thus reduce the accuracy of the neural network on other input data.

In one embodiment, the neural network 113 may be or may include a binarized neural network. A binarized neural network may be a neural network where the all of weights of the neural network have one of two possible values. For example, a weight may either be 0 or 1. In another example, a weight may either be 1 or −1. A binarized neural network may reduce the amount of space to store the weights as compared to a neural network that user fixed or floating point numbers to represent the weights. For example, the neural network 113 may use one bit to represent a weight for a connection between two nodes, as compared to another neural network that may use 8 bits to represent a fixed point number. This may reduce the amount of space (e.g., the amount of storage space) used to store the weight data 142 by up to 8 times. In another example, the neural network 113 may use one bit to represent a weight for a connection between two nodes, as compared to another neural network that may use 32 bits to represent a floating point number. This may reduce the amount of space (e.g., the amount of storage space) used to store the weight data 142 by up to 32 times. Thus, using a binarized neural network may allow the computing device 110 and/or the data storage device 120 to use less storage space to store the weight data 142.

Although the present disclosure may refer to a binarized neural network, in other embodiments, a different number of bits may be used to represent a weight. For example, instead of using one bit to represent a weight (as in a binarized neural network), two bits, three bits, or another appropriate number of bits may be used. Although more than one bit may be used in other types of neural networks, the amount of storage space to store the weight data 142 may still be reduced when compared to using floating point or fixed point numbers to represent the weights.

In one embodiment, the neural network 113 may use one or more filters. A filter may be a set of nodes and/or connections that may be used to process input data that is provided to the neural network 113. The filter is associated with a set of weights (e.g., one or more weights) for the nodes and/or connections that are associated with the filter. The filter may allow the neural network 113 to identify a feature in the input data that is provided to the neural network 113. The filter may be used to generate a feature map which allows the neural network to identify or detect features in input data.

In one embodiment, the data storage device 120 (and/or the processing device 111) may use a parity check to determine whether there is an error in one or more weights of a set of weights. For example, a set of weights may be associated with a filter (e.g., a convolution filter) of the neural network 113. The data storage device 120 may perform a parity check on the weights in the set of weights and may determine whether the set of weights passes or fail the parity check. If there are no errors in the set of weights, the set of weights may pass the parity check. If there are one or more errors in the set of weights, the set of weights may fail (e.g., may not pass) the parity check. In some embodiments, the data storage device 120 (e.g., the controller 130) may transmit a message, packet, frame, or other data indicating the result of the parity check to the processing device 111. The processing device 111 may determine whether to use the set of weights based on the results of the parity check received from the data storage device 120.

In one embodiment, the data storage device 120 (and/or the processing device 111) may use a single parity check for multiple weights. For example, there may be nine weights associated with a filter, and each weight may have a value of 1 or 0 (e.g., for a binarized neural network). The data storage device 120 may sum or add all of the nine weights to determine whether the sum is equal to an expected value (e.g., whether the sum is equal to 0 or 1). If the sum of all nine weights is equal to the expected value, then the nine weights (e.g., the set of eights) passes the parity check. If the sum of all nine weights is not equal to the expected value, then the nine weights (e.g., the set of eights) fails the parity check. In another example, there may be sixteen weights associated with a filter and each weight may have a value of 1 (e.g., +1) or −1. The data storage device may multiply all of the sixteen weights with each other to determine whether the product of the sixteen weights is equal to an expected value (e.g., whether the product of the weight is equal to −1 or +1). Thus, a parity check (e.g., a single parity check) may be shared among multiple weights (e.g., the single parity check is used to determine whether there are one or more errors in multiple weights).

In one embodiment, if a set of weights, associated with a filter, does not have errors (e.g., the set of weights passes the parity check), the processing device 111 may use the set of weights to process the input data. For example, processing device 111 may use the filter on the input data to generate feature maps. The weights of the filter may be applied to the input data (e.g., multiplied with the input data) to generate the feature maps. The neural network 113 may use the feature maps to identify one or more features in the input data.

If a set of weights, associated with a filter, has one or more errors (e.g., the set of weights fails the parity check, one or more weights in the set of weights is incorrect, etc.), the processing device 111 may selectively refrain from using the set of weights to process the input data. In one embodiment, the processing device 111 may selectively refrain from using the set of weights by not using feature maps generated by the filter associated with the set of weights. For example, the processing device 111 may apply the filter to the input data. However, because the set of weights associated with the filter has one or more errors (as indicated by the failed parity check), the processing device 111 may not use, may ignore, may discard, etc., one or more of the feature maps that are generated by the filter. This may allow the neural network 113 to continue to process the input data using other filters, even though there are errors in one or more weights associated with the current filter. In another embodiment, the processing device may selectively refrain from using the set of weights by not using the filter associated with the set of weights. For example, the processing device 111 may not apply the filter to the input data because the set of weights, associated with the filter, has one or more errors (as indicated by the failed parity check).

In one embodiment, the data storage device 120 may generate parity data (e.g., a parity bit) that may be used to determine whether a set of weights has one or more errors (e.g., whether a set of weights associated with a filter has one or more errors). The parity data may indicate an expected value of the parity check when the parity check is performed on the set of weights. For example, parity data may indicate whether the expected value of a parity check should be 0 or 1 when the set of weights are summed or added. In another example, the parity data may indicate whether the expected value of a parity check should be −1 or +1 when the set of weights are multiplied.

In one embodiment, the weight data 142 may be stored in a resistive non-volatile memory (e.g., a resistive memory device). A resistive non-volatile memory may be a memory device that operates by changing the resistance across a dielectric solid-state material. The resistive non-volatile memory may store data as changes in resistance (e.g., electrical resistance). Examples of resistive non-volatile memory may include, but are not limited to, magnetoresistive memory (MRAM), phase change memory (PCM, PCRAM), resistive RAM (RRAM), memristors, etc. I In one embodiment, resistive non-volatile memories may be used in neuromorphic computing. Neuromorphic computing may use analog circuits to mimic or model neurobiological architectures present in nervous systems, such as the human brain. Neuromorphic computing may be implemented on a hardware level using resistive non-volatile memories such as RRAM, memristors, etc.

In one embodiment, when a resistive non-volatile memory and/or neuromorphic computing are used by the computing device 110, the weights of the neural network 113 (e.g., the weight data 142) may be represented by the resistance of the cells of the resistive non-volatile memory. The input data and signals that flow between the connections of the nodes of the neural network may be voltages. In a resistive non-volatile memory, an ECC may not be used correct cells that have the wrong resistance (e.g., wrong or incorrect weights) because the resistance of a cell is a physical property of the cell that generally cannot be changed. However, the parity check discussed above may be used to detect errors in the resistance of one or more cells of the resistive non-volatile memory and neural network 113 may selectively refrain from using the filters that use the cells that have the errors in resistance.

In one embodiment, the data storage device 120 and/or the computing device 110 may use an ECC to store the structure data 141. As discussed above, the structure data 141 may be smaller than the weight data 142. Thus, even though an ECC may increase the amount of space to store the structure data 141, it may still be useful to use an ECC to protect the structure data 141 from errors, loss, corruption, etc. In another embodiment the structure data 141 may be stored in a separate non-volatile memory and/or separate non-volatile memory device than the weight data 142. For example, the structure data 141 may be stored on a flash memory device and the weight data 142 may be stored on a resistive memory device.

As discussed above, a data storage device (e.g., a controller of a data storage device) may use ECCs to generate codewords to protect data from errors, loss, corruption, etc. However, using ECCs to protect data may increase the amount of space that is used to store the protected data. For example, if the data storage device 120 uses an ECC to generate a codeword to encode data, the amount of space used to store the codeword may be twenty percent more than the amount of space to store the data without encoding the data into a codeword. If ECCs are used to protect the weight data 142 (e.g., the weight of the neural network 113) from errors, this may increase the amount of space used to store the weights of the neural network 113 even more.

In one embodiment, the computing device 110 and/or the data storage device 120 may not use an ECC to protect the weight data 142 from errors, corruption, loss, etc. The computing device 110 and/or the data storage device 120 may use a parity check and/or parity data (which may use less storage space than a codeword generated by the ECC). Because an ECC is not used to protect the weight data 142, the amount of storage space used to store the weight data 142 may be reduced while still allowing the computing device 110 to determine whether one or more filters of the neural network 113 should be used (e.g., based on the results of the parity checks). The computing device 110 and/or data storage device may bypass or refrain from ECC encoding (e.g., generating codewords), and may use the parity checks and/or parity data to detect errors in the weight data 142.

In addition, by using the parity checks and/or parity data, the computing device 110 may reduce the amount of time for the neural network 113 to process, analyze, etc., the input data. For example, if the computing device 110 determines that one or more weights, associated with a filter, have errors, the computing device 110 may not use that filter (e.g., may not apply the filter to the input data). This may reduce the amount of time (e.g., computation time) for the neural network 113 to process the input data because the neural network 113 may not perform the computations, operations, functions, etc., to apply the filter to the input data. This may also decrease the computing resources that may be used by the processing device 111. For example, this may reduce the amount of power used by the processing device 111. In another example, this may reduce the number of processing units (e.g., processing cores, computational units such as arithmetic logic units, etc.) that are used by the processing device 111.

Although one or more filters may not be used due to errors in one or more weights, the neural network 113 may be able to process/analyze input data and identify features in the input data accurately due to the dropout technique used in the training of the neural network 113. As discussed above, the dropout technique allows the neural network 113 to use a subset of the nodes, connections, and/or weights to identify features in the input data. Thus, the neural network 113 may still be able to accurately identify features or process input data even though one or more filters and/or feature maps may not be used.

Furthermore, the neural network 113 may be a binarized neural network which may further reduce the amount of space that is used to store the weight data 142. For example, by using two possible values for the weights of the neural network 113, each weight in the neural network 113 may be represented using one bit. This allows the amount of space used to store a weight to be greatly reduced when compared to other representations for the weights (e.g., when compared to a 32-bit floating or fixed point number for the weights).

Figure 2:
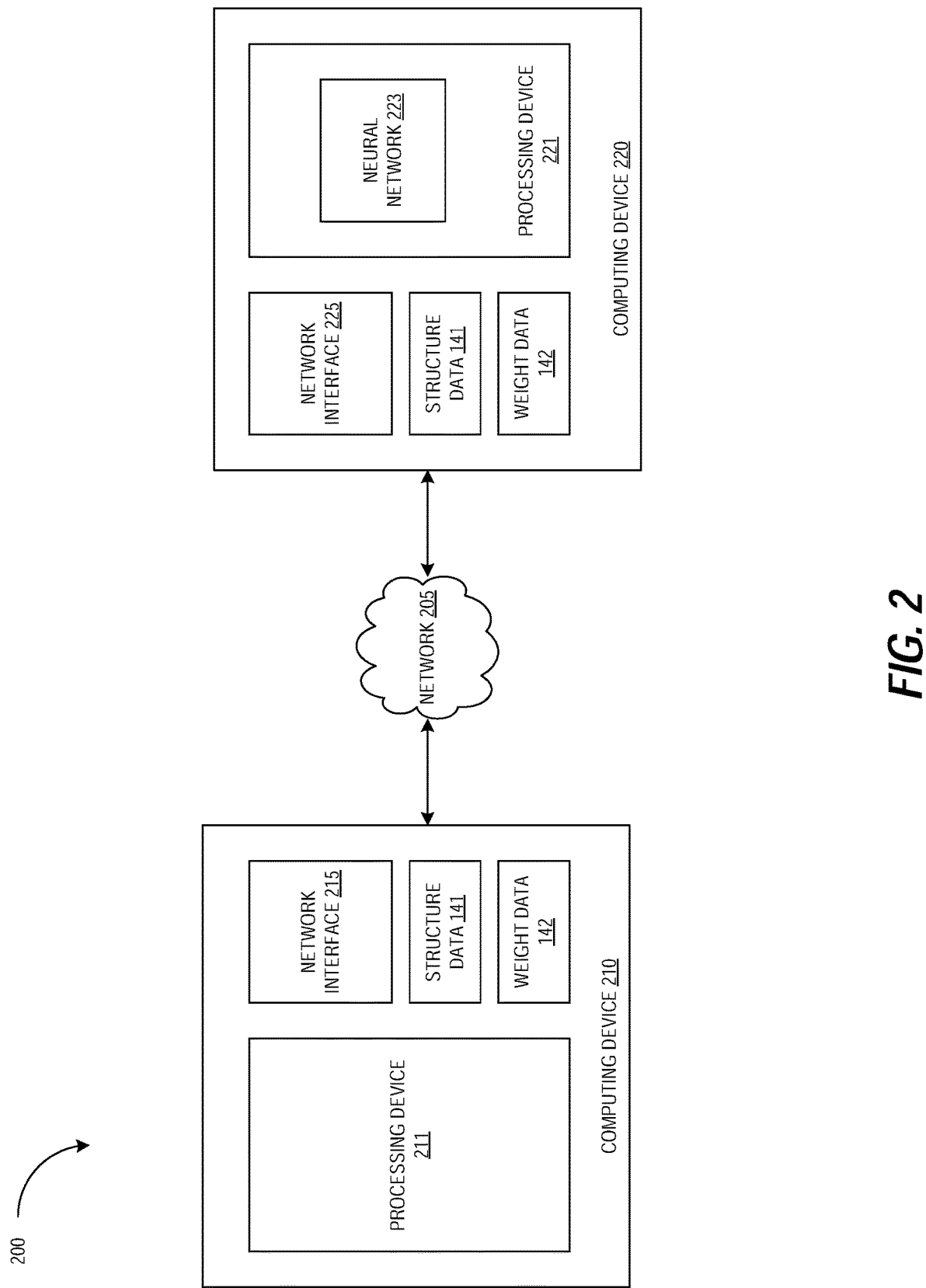
FIG. 2 is a diagram illustrating an example system architecture, in accordance with one or more embodiments of the present disclosure.

FIG. 2 is a diagram illustrating an example system architecture 200, in accordance with one or more embodiments of the present disclosure. The system architecture 200 includes a computing device 210 and a computing device 220 coupled to each other via a network 205. Examples of computing devices include, but are not limited to, phones (e.g., smart phones, cellular phones, etc.), cable set-top boxes, smart televisions (TVs), video game consoles, laptop computers, tablet computers, desktop computers, server computers, personal digital assistances, wearable devices (e.g., smart watches), media players, and/or other types of electronic devices. In one embodiment, network 205 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

Computing device 210 includes a processing device 211 and a network interface 215. The network interface 215 may be hardware (e.g., a network interface card), software (e.g., drivers, applications, etc.), and/or firmware that allows the computing device 210 to communicate data with the network 205. The network interface card may be used to transmit and/or receive blocks of data, packets, messages, etc. The computing device 210 also includes structure data 141. The structure data may define or indicate the nodes in the neural network 223 and how the nodes are interconnected, as discussed above. The computing device 210 further includes weight data 142. The weight data 142 may indicate weights and/or weight values that are associated with the nodes and/or connections between the nodes, as discussed above.

Computing device 220 includes a processing device 221 and a network interface 225. The network interface 225 may be hardware (e.g., a network interface card), software (e.g., drivers, applications, etc.), and/or firmware that allows the computing device 220 to communicate data with the network 205. The computing device also includes structure data 141 and weight data 142. In one embodiment, the computing device 210 may transmit the structure data 141 and/or the weight data 142 to the computing device 220 via the network 205.

In one embodiment, the processing device 221 may construct the neural network 223 based on structure data 141 and/or the weight data 142. As discussed above, the neural network 223 may be a binarized neural network. A binarized neural network may be a neural network where the all of weights of the neural network have one of two possible values (e.g., 0 or 1, +1 or −1, etc.).

In one embodiment, the neural network 223 may use one or more filters to identify features in the input data. The filter is associated with a set of weights (e.g., one or more weights) for the nodes and/or connections that are associated with the filter. The processing device 221 may use a parity check to determine whether there is an error in one or more weights of a set of weights. The processing device 221 may use a single parity check for multiple weights. If the set of weights does not have errors, the processing device 221 may use the set of weights to process the input data. If the set of weights has one or more errors, the processing device 221 may selectively refrain from using the set of weights to process the input data. For example, the processing device 221 may process the input data using weights that do not include the set of weights (e.g., may process the input data without using the set of weights).

In one embodiment, the processing device 221 may not use feature maps generated by the filter associated with the set of weights, if the set of weights has one or more errors. In another embodiment, the processing device 221 may selectively refrain from using the filter associated with the set of weights, if the set of weights has one or more errors. For example, the processing device 221 may use other filters and may not use the filter associated with the set of weights.

In one embodiment, the data storage device 120 may generate parity data (e.g., a parity bit) that may be used to determine whether a set of weights has one or more errors (e.g., whether a set of weights associated with a filter has one or more errors). The parity data may indicate an expected value of the parity check when the parity check is performed on the set of weights.

In one embodiment, the weight data 142 may be stored in a resistive non-volatile memory (e.g., a resistive memory device). When a resistive non-volatile memory and/or neuromorphic computing are used by the computing device 220, the weights of the neural network 223 (e.g., the weight data 142) may be represented by the resistance of the cells of the resistive non-volatile memory. The input data and signals that flow between the connections of the nodes of the neural network 223 may be voltages.

In one embodiment, the data storage device 120 and/or the computing device 110 may use an ECC to store the structure data 141. In another embodiment the structure data 141 may be stored in a separate non-volatile memory and/or separate non-volatile memory device than the weight data 142. For example, the structure data 141 may be stored on a flash memory device and the weight data 142 may be stored on a resistive memory device.

In one embodiment, the computing device 110 and/or the data storage device 120 may not use an ECC to protect the weight data 142 from errors, corruption, loss, etc. Because an ECC is not used to protect the weight data 142, the amount of storage space used to store the weight data 142 may be reduced while still allowing the computing device 220 to determine whether one or more filters of the neural network 223 should be used. In addition, by using the parity checks and/or parity data, the computing device 110 may reduce the amount of time for the neural network 223 to process, analyze, etc., the input data, as discussed above. The computing device 220 may also reduce the amount of time (e.g., computation time) for the neural network 223 to process the input data because the neural network 223 may not perform the computations, operations, functions, etc., to apply the filter to the input data. This may also decrease the computing resources that may be used by the processing device 221. Furthermore, the neural network 223 may be a binarized neural network which may further reduce the amount of space that is used to store the weight data 142.

Figure 3:
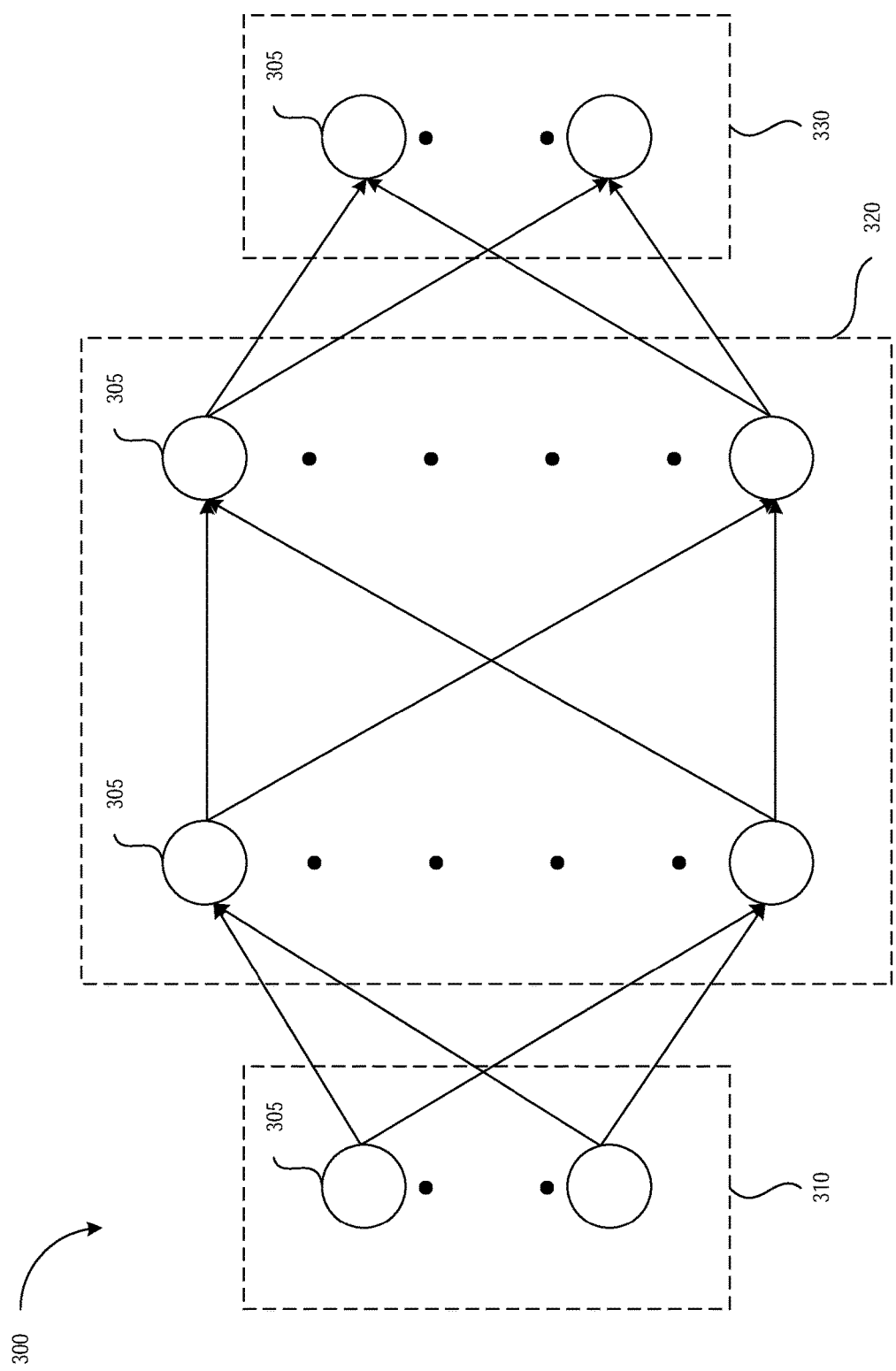
FIG. 3 is a diagram illustrating an example neural network, in accordance with one or more embodiments of the present disclosure.

FIG. 3 is a diagram illustrating an example neural network 300, in accordance with one or more embodiments of the present disclosure. The neural network 300 may be used to model relationships between (e.g., complex) inputs and outputs or to find patterns in data, where the dependency between the inputs and the outputs may not be easily ascertained. The neural network 300 may also be a computing model that may be used to determine a feature in input data through various computations. For example, the neural network 300 may determine a feature (e.g., a number, shape, pattern, etc.) in input data (e.g., audio data, image data, video data, etc.) according to a structure that defines a sequence of computations to be performed.

The neural network 300 may be a CNN. A CNN may be a feed forward neural network. A feed forward neural network may be a type of neural network where the connections between the nodes do not form a cycle. For example, the signals, messages, data, information etc., flow forward from the input layer 310 (e.g., from the input nodes), through the hidden layer 320, to the output layer 330 (e.g., to the output nodes) of the neural network 300 from left to right. The signals, messages, data, information etc., may not go backwards through the neural network (e.g., may not go from right to left). A CNN may be used for image analysis. The weights of the connections may take the form of a convolutional filter that may be applied to different pixels of an image. Although the present disclosure may refer to image analysis for CNNs, in other embodiments, the CNN may be used for other types of data and inputs.

The neural network 300 includes an input layer 310, a hidden layer 320, and an output layer 330. Each of the input layer 310, the hidden layer 320, and the output layer 330 includes one or more nodes 305. Each of the input layer 310, the hidden layer 320, and the output layer 330 may have a different number of nodes 305. The neural network 300 may be a deep neural network or a deep CNN. A neural network may be deep if the hidden layer 320 includes multiple levels (e.g., multiple columns of nodes 305, multiple sub-layers of nodes 305). As illustrated in FIG. 3, the neural network 300 includes two levels (or sub-layers) of nodes 305 (e.g., two columns of nodes 305).

Each of the nodes 305 in a layer is connected to either a node 305 in the next level (e.g., next sub-layer) or a node 305 in another layer, as represented by the arrows/lines between the nodes 305. For example, the nodes 305 in the input layer are each coupled to at least one node 305 in the hidden layer 320. Neural network 300 may be a fully connected neural network. For example, each node 305 in each layer or level is connector to each node in the subsequent layer or level where there is a subsequent layer or level (e.g., nodes 305 in the output layer 330 are not connected to other nodes).

Each connection may be associated with a weight or weight value (e.g., may have a weight). A weight or weight value may define coefficients applied to the computations. For example, the weights or weight values may be scaling factors between two or more nodes 305. Each node 305 may represent a summation of its inputs, and the weight or weight value associated with a connection may represent a coefficient or a scaling factor multiplied to an output of a node 305 in that connection. The weights between the nodes 305 may be determined, calculated, generated, assigned, learned, etc., during a training process for the neural network. For example, backpropagation may be used to set the weights such that the neural network 300 produces expected output values given corresponding values in labeled training data. Thus, the weights of the hidden layers can be considered as an encoding of meaningful patterns in the data. The weights of the connections between the nodes 305 may be modified by additional training.

In one embodiment, the neural network 300 may be a binarized neural network. A binarized neural network may be a neural network where the all of weights (e.g., weight values) of the neural network have one of two possible values (e.g., 0 or 1, +1 or −1, etc.). As discussed above, a binarized neural network may reduce the amount of space used to store weight data (e.g., weights and/or weight values for nodes and/or connections). A parity check may be used to determine whether a set of weights for a filter of the neural network 300, has errors. If the set of weights does not have errors, the filter may be used by the neural network 300 to process input data. If the set of weights does have errors, the filter may not be used by the neural network 300 to process input data.

Although neural network 300 is depicted with a particular number of nodes 305, layers, and connections, various neural network architectures/configurations may be used in other embodiments. For example, different fully connected neural networks and partially connected neural networks (e.g., where all nodes in adjacent layers are not connected) may be used.

Figure 4:
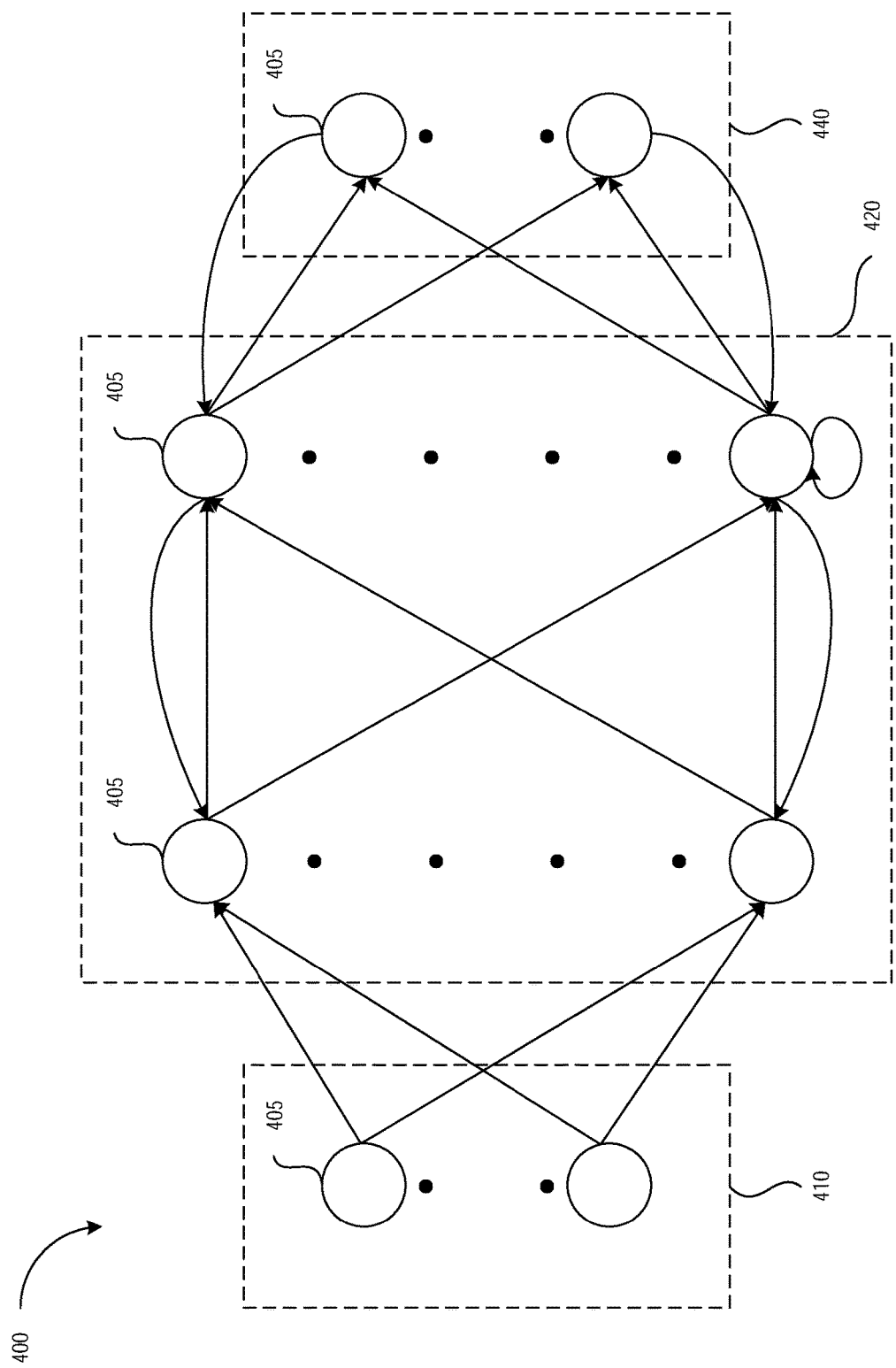
FIG. 4 is a diagram illustrating an example neural network in accordance with one or more embodiments of the present disclosure.

FIG. 4 is a diagram illustrating an example neural network 400, in accordance with one or more embodiments of the present disclosure. The neural network 400 may be used to model relationships between inputs and outputs or to find patterns in data, where the dependency between the inputs and the outputs may not be easily ascertained. The neural network 400 may also be a computing model that may be used to determine a feature in input data through various computations.

In another embodiment, the neural network 400 may be a RNN. A RNN may be a neural network where the connections between nodes may form a directed graph. A RNN may be a type of neural network where the connections between the nodes may form a cycle and/or may go in a backwards direction. For example, the signals, messages, data, information etc., may flow both forward (e.g., from left to right) and backwards (e.g., from right to left) between the nodes 405 of the neural network. The RNN may use memory units, such as long-short-term-memory (LSTM) units. The LSTM units may allow the RNN to backpropagate errors through layers (e.g., backwards through the layers or sub-layers) over time. This may allow a RNN to exhibit temporal dynamic behavior. Although the present disclosure may refer to sequence analysis and/or prediction for RNNs, in other embodiments, the RNN may be used for other types of data and inputs.

The neural network 400 includes an input layer 410, a hidden layer 420, and an output layer 440. Each of the input layer 410, the hidden layer 420, and the output layer 440 includes one or more nodes 405. Each of the input layer 410, the hidden layer 420, and the output layer 440 may have a different number of nodes 405. The neural network 400 may be a deep neural network or a deep RNN. A neural network may be deep if the hidden layer 420 includes multiple levels (e.g., multiple columns of nodes 405, multiple sub-layers of nodes 405). As illustrated in FIG. 4, the neural network 400 includes two levels (or sub-layers) of nodes 405 (e.g., two columns of nodes 405). A RNN may be used for sequence analysis and/or prediction. For example, the RNN may recognize patterns in sequences of data, such as handwriting, text, numerical time series data, etc.

Each of the nodes 405 in a layer is connected to at least one other node, as represented by the arrows/lines between the nodes 405. Each connection may be associated with a weight or weight value (e.g., may have a weight). A weight or weight value may define coefficients applied to the computations. Each node 405 may represent a summation of its inputs, and the weight or weight value associated with a connection may represent a coefficient or a scaling factor multiplied to an output of a node 405 in that connection. The weights between the nodes 405 may be determined, calculated, generated, assigned, learned, etc., during a training process for the neural network. Thus, the weights of the hidden layers can be considered as an encoding of meaningful patterns in the data. The weights of the connections between the nodes 405 may be modified by additional training.

In one embodiment, the neural network 400 may be a binarized neural network. A binarized neural network may be a neural network where the all of weights (e.g., weight values) of the neural network have one of two possible values (e.g., 0 or 1, +1 or −1, etc.). As discussed above, a binarized neural network may reduce the amount of space used to store weight data (e.g., weights and/or weight values for nodes and/or connections). A parity check may be used to determine whether a set of weights for a filter of the neural network 400, has errors. If the set of weights does not have errors, the filter may be used by the neural network 400 to process input data. If the set of weights does have errors, the filter may not be used by the neural network 400 to process input data.

Although neural network 400 is depicted with a particular number of nodes 405, layers, and connections, various neural network architectures/configurations may be used in other embodiments. For example, different fully connected neural networks and partially connected neural networks (e.g., where all nodes in adjacent layers are not connected) may be used.

Figure 5:
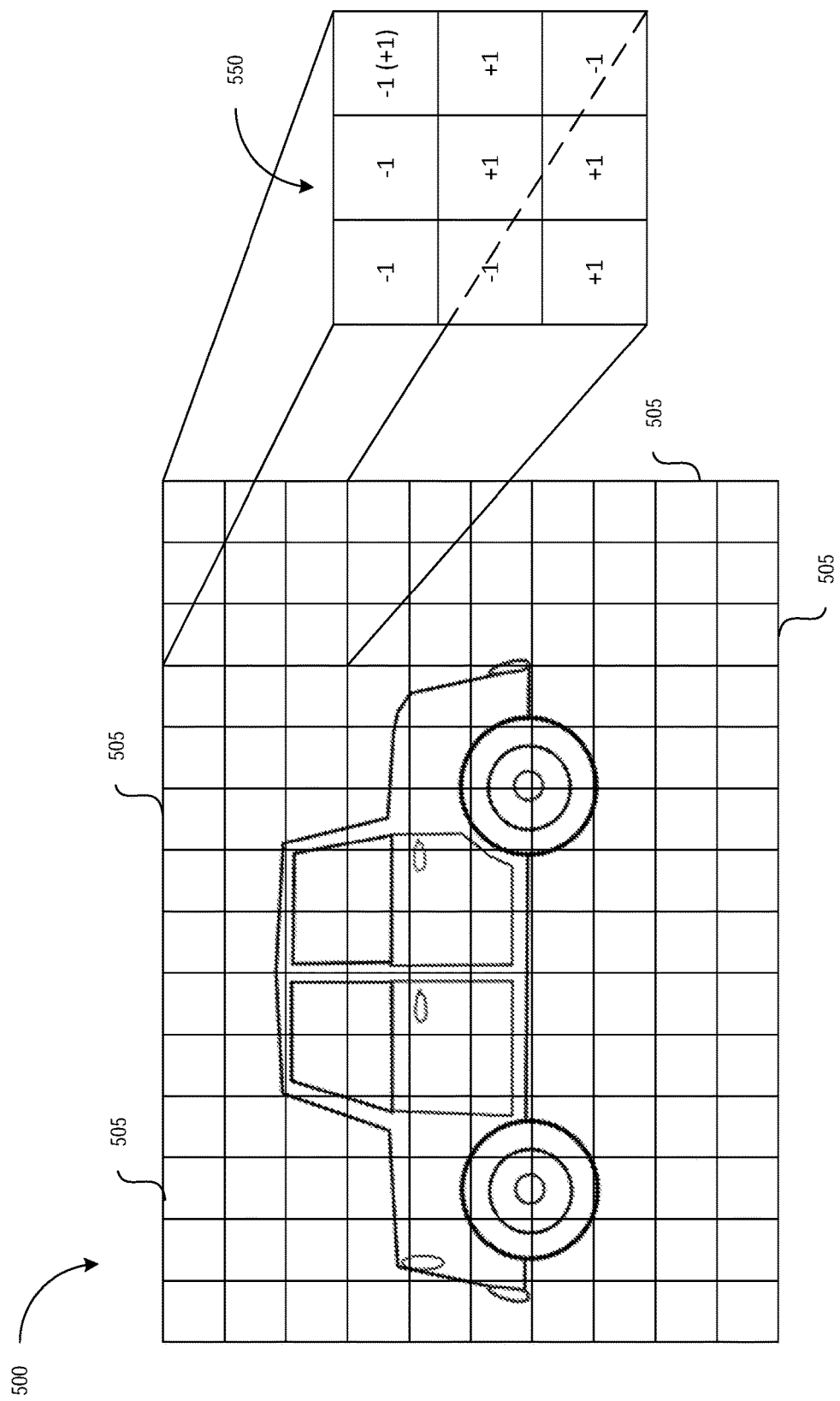
FIG. 5 is a diagram illustrating an example data object that may be provided to a neural network, in accordance with one or more embodiments of the present disclosure.

FIG. 5 is a diagram illustrating an example data object 500 that may be provided to a neural network, in accordance with one or more embodiments of the present disclosure. The data object 500 may be data structure that may be divided into different portions. In one embodiment, the data object 500 may be an image file (e.g., a digital image). Each portion of the data object 500 may be a pixel 505 of the image file. As illustrated in FIG. 5, the data object 500 may include fourteen columns of pixels 505 and ten rows of pixels 505 (e.g., may be a 14×10 image).

As discussed above, a filter 550 of a neural network (e.g., a CNN, a RNN, a binarized neural network) may be used to process input data. The data object 500 (e.g., the image file) may be the input data provided to the neural network. The filter 550 may be applied to different portions of the data object 500 to identify features in the data object. For example, the filter 500 may be applied to the data object 500 (e.g., an image file) to identify cars in the image file. The filter 500 may be associated with nodes and/or connections of the neural network. The filter 500 may indicates weights (or weight values) for the nodes and/or connections of the neural network. As illustrated in FIG. 5, the weights may have one of two values, +1 or −1. Also as illustrated in the FIG. 5, the top right weight should have a value of +1, as indicated by the parentheses. However, due to an error, corruption, etc., in a non-volatile memory where the weights are stored, the value has of the top-right weight has changed to −1.

In one embodiment, a processing device may perform a parity check on the weights associated with the filter 550. For example, the processing device may multiple all of the weights in the filter 550 as follows: −1 * −1 * −1 * −1 * 1 * 1 * 1 * 1 * −1. The product of the weights in the filter 550 may be −1. However. the expected value of the product of the weights in the filter 550 (e.g., the expected value of the parity check) is +1. Thus, the processing device may determine that the weights associated with the filter 550 should not be used. The processing device may ignore, discard, etc., features maps that are generated by the filter 500, or may not apply the filter 500 to the data object 500, as discussed above.

Figure 6:
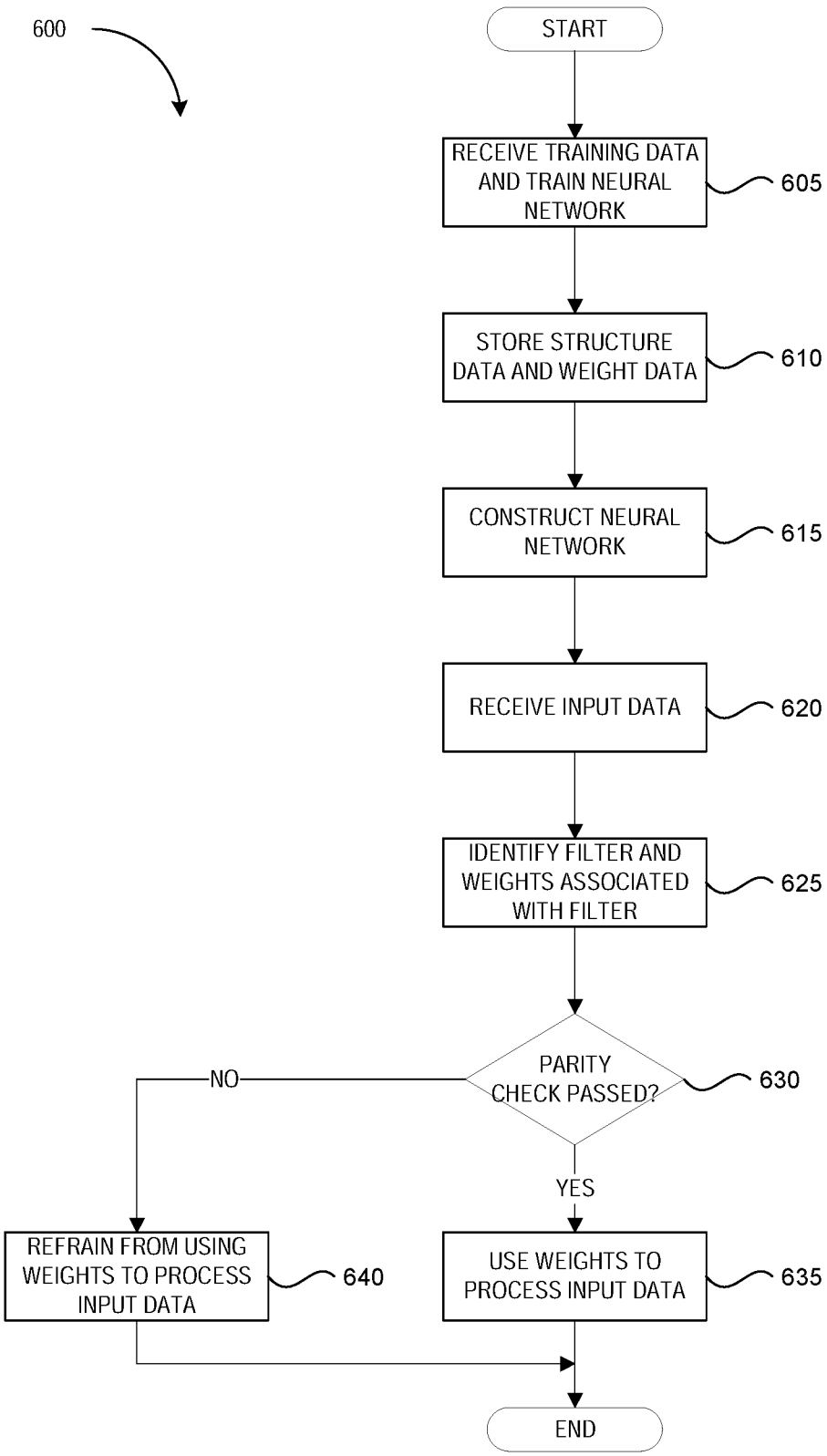
FIG. 6 is a flowchart illustrating an example a process for decoding data, in accordance with one or more embodiments of the present disclosure.

FIG. 6 is a flowchart illustrating an example a method 600 for decoding data, in accordance with one or more embodiments of the present disclosure. The method 600 may be performed by a processing device (e.g., a processor, a central processing unit (CPU), a controller, an application-specific integrated circuit (ASIC), a field programmable gate array (FPGA), etc.), a neural network, etc. For example, the method 600 may be performed by a processing device of a computing device. The controller, processing device, and/or neural network may be processing logic that includes hardware (e.g., circuitry, dedicated logic, programmable logic, microcode, etc.), software (e.g., instructions run on a processor to perform hardware simulation), firmware, or a combination thereof.

The method 600 starts at block 605 where the method 600 receives training data and trains a neural network using the training data. As discussed above, a dropout technique may be used during the training. At block 610, the method 600 may store structure data and weight data for the neural network, based on the training. As discussed above, the structure data may indicate the nodes of the neural network and how the nodes are connected. The weight data may indicate weights and/or weight values associated with the nodes and/or connections.

At block 615, the method 600 may construct the neural network based on the structure data and the weight data. The method 600 may begin executing or operating the neural network after constructing the neural network. At block 620, the method 600 may receive input data and may begin processing, analyzing, etc., the input data. As discussed above, one or more filters may be used to process, analyze, etc., the input data to identify features in the input data. At block 625, the method 600 may identify a filter and the weights associated with the filter. At block 630, the method 600 may perform a parity check for the weights (e.g., multiple weights) associated with the filter. For example, the method 600 may determine the sum or product of the weights associated with the filter, as discussed above. If the parity check passes (e.g., there are no errors in the weights associated with the filter), the method 600 may use the weights to process the input data at block 635. For example, the method 600 may apply the filter to the input data. If the parity check fails (e.g., does not pass), the method 600 may selectively refrain from using the weights to process the input data at block 640. For example, the method 600 may ignore, discard, not use, etc., the feature maps generated by the filter. In another example, the method 600 may selectively refrain from applying the filter to the input data.

In some embodiments, the blocks 625, 630, 635, and 640 may be repeated multiple times. For example, the neural network may include multiple filters (e.g. tens, hundreds, thousands, etc.) of filters. The blocks 625, 630, 635, and 640 may be repeated for each filter of the neural network.

Although the present disclosure may refer to CNNs, RNNs, etc., other types of neural networks and/or machine learning methods, functions, techniques, operations, data structures, etc., may be used in other embodiments. For example, a probabilistic neural network may be used in other embodiments.

Some embodiments of the present disclosure may be used to reduce the amount of space that is used to store weights for neural networks. A binarized neural network may be used to reduce the data used to store the weights for the neural network. In addition, a parity check and/or parity data, rather than ECCs and codewords, may be used to check the weights for errors. This may further reduce the amount of space used to store weights for neural networks. If errors are detected in a set of weights associated with a filter, the neural network may selectively refrain from using the set of weights and/or the filter, which may reduce the computing resources and/or power used by a computing device.

General Comments

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A method, comprising:
   storing a plurality of weights of a neural network comprising a plurality of nodes and a plurality of connections between the plurality of nodes, wherein:
   each weight of at least some of the plurality of weights is associated with a connection of the plurality of connections; and
   the neural network comprises a binarized neural network;
   receiving input data to be processed by the neural network;
   performing a parity check to determine whether there is one or more errors in one or more weights in a set of weights of the plurality of weights, wherein the set of weights comprises multiple weights, and the multiple weights share the parity check; and
   selectively refraining from using the set of weights to process the input data using the neural network in response to determining that the set of weights comprises the one or more errors.

2. The method of claim 1, further comprising:
   using the set of weights to process the input data using the neural network in response to determining that the set of weights does not comprises the one or more errors.

3. The method of claim 1, wherein each weight of the plurality of weights comprises one of two values.

4. The method of claim 1, wherein:
   the set of weights are associated with a filter; and
   the filter is configured to generate a feature map.

5. The method of claim 4, wherein refraining from using the set of weights comprises:
   refraining from generating the feature map.

6. The method of claim 4, wherein refraining from using the set of weights comprises:
   ignoring the feature map generated by the filter.

7. The method of claim 1, wherein determining whether the set of weights of the plurality of weights comprises the one or more errors is based on a single parity check.

8. The method of claim 7, wherein:
   the set of weights comprises multiple weights; and
   the single parity check is shared among the multiple weights.

9. The method of claim 1, further comprising:
constructing the neural network based on a structure of the neural network, wherein the structure of the neural network indicates interconnections between the plurality of nodes.

10. The method of claim 1, further comprising:
receiving training data; and
training the neural network based on the training data, wherein the plurality of weights are generated during the training of the neural network.

11. The method of claim 1, wherein the plurality of weights are stored on a resistive non-volatile memory.

12. A device, comprising:
a network interface; and
a processing device configured to:
receive, via the network interface, a plurality of weights of a neural network, wherein:
the neural network comprises a plurality of nodes and a plurality of connections between the plurality of nodes;
each weight of at least some of the plurality of weights is associated with a connection of the plurality of connections; and
each weight of at least some of the plurality of weights comprises one of two values;
perform a parity check to determine whether there is one or more errors in one or more weights in a set of weights of the plurality of weights, wherein the set of weights comprises multiple weights, and the multiple weights share the parity check; and
selectively refrain from using the set of weights to process input data using the neural network in response to determining that the set of weights comprises the one or more errors.

13. The device of claim 12, wherein the processing device is further configured to:
use the set of weights to process the input data using the neural network in response to determining that the set of weights does not comprises the one or more errors.

14. The device of claim 12, wherein the neural network comprises a binarized neural network.

15. The device of claim 12, wherein:
the set of weights are associated with a filter; and
the filter is configured to generate a feature map.

16. The device of claim 15, wherein the processing device is further configured to, in refraining from using the set of weights:
refrain from generating the feature map.

17. The device of claim 15, wherein the processing device is further configured to, in refraining from using the set of weights:
ignore the feature map generated by the filter.

18. The device of claim 12, wherein determining whether the set of weights of the plurality of weights comprises the one or more errors is based on a single parity check.

19. The device of claim 18, wherein:
the set of weights comprises multiple weights; and
the single parity check is shared among the multiple weights.

20. An apparatus, comprising:
a processing device configured to:
store a plurality of weights of a neural network comprising a plurality of nodes and a plurality of connections between the plurality of nodes, wherein:
each weight of the plurality of weights is associated with a connection of the plurality of connections; and
the neural network comprises a binarized neural network;
determine whether a set of weights of the plurality of weights comprises one or more errors based on a parity check, wherein:
the set of weights comprises multiple weights; and
the multiple weights share the parity check; and
selectively refrain from using the set of weights to process input data using the neural network in response to determining that the set of weights comprises the one or more errors.

* * * * *